United States Patent [19]
Kaelin

[11] 3,820,764
[45] June 28, 1974

[54] SEWAGE TREATMENT PLANT EQUIPPED WITH AN AERATION IMPELLER

[76] Inventor: Joseph Richard Kaelin, Villa Seeburg Buocks, Buochs, Switzerland

[22] Filed: Jan. 19, 1972

[21] Appl. No.: 218,912

[30] Foreign Application Priority Data
Jan. 26, 1971  Switzerland.................. 1162/71

[52] U.S. Cl.................. 261/91, 210/219
[51] Int. Cl............................ B01f 7/16
[58] Field of Search ........... 261/91; 210/197, 219

[56] References Cited
UNITED STATES PATENTS
| | | |
|---|---|---|
| 2,165,889 | 7/1939 | Fischer et al. ........ 261/91 |
| 2,295,391 | 9/1942 | Durdin, Jr. ........... 210/219 |
| 3,218,042 | 11/1965 | Ciabattari et al. ..... 261/91 |
| 3,341,450 | 9/1967 | Ciabattari et al. ..... 261/91 |
| 3,539,158 | 11/1970 | Roos .................. 261/91 |
| 3,606,984 | 9/1971 | Robertson ............. 261/91 |

Primary Examiner—Frank W. Lutter
Assistant Examiner—Steven H. Markowitz
Attorney, Agent, or Firm—McGlew and Tuttle

[57] ABSTRACT

A sewage treatment plant is equipped with a motor driven aerator which is supported in a basin at least at three points. The support mechanism for the aerator embodies at least two supports which at least at their ends closest to the aerator enclose an acute angle with a horizontal plane which is less than 45°.

5 Claims, 4 Drawing Figures

PATENTED JUN 28 1974 3,820,764

SEWAGE TREATMENT PLANT EQUIPPED WITH AN AERATION IMPELLER

BACKGROUND OF THE INVENTION

The present invention relates to a new and improved sewage treatment plant of the type equipped with a motor driven aerator which is supported at least at three points in a basin.

Sewage treatment plants are known to the art wherein there is provided a support mechanism for the motor driven aerator composed of an aeration impeller or gyroscope and a drive unit. In state-of-the-art purification installations the support mechanism possesses the form of a tripod. The legs of this support mechanism are formed by supports which are interconnected at one end and carry the aeration impeller and at the other end are supported upon the basin floor.

Each of these supports is in the form of a straight rod, which rods extend directly from their point of connection to their support locations at the basin floor.

The drive motor is suspended at the connection location of the supports located above the level of the sewage or waste water in such a manner that its aeration impeller immerses into the sewage or waste water. The drive unit is conventionally arranged above the connection location of the supports. By virtue of the above-described construction it should be apparent that those portions of the supports located at the region of the sewage level are disposed relatively close to the periphery of the aeration impeller. Since the sewage or waste water tends to be sprayed at the region surrounding the aeration impeller such tends to deposit upon the near portions of the supports. During operation of the sewage treatment plant in winter this will result in the formation of ice at the supports. The presence of this ice then constitutes an additional load for the support mechanism which during continuous operation of the sewage treatment plant can become so great that it can result in overloading of the support mechanism.

Now in order to overcome this condition it is already known to the art to arrange a bridge over the activator basin and to secure the aeration impeller to this bridge. However, this solution has the disadvantage that during operation of the motor driven aerator oscillations appear at the central point of the bridge, which has a deleterious affect upon the longevity of the aeration equipment.

SUMMARY OF THE INVENTION

Hence, from what has been explained above it should be apparent that a need still exists in the art for a sewage treatment plant equipped with an aeration impeller or gyroscope which is not associated with the aforementioned drawbacks and limitations of the prior art constructions. Therefore, it is a primary objective of the present invention to provide a novel construction of sewage treatment plant equipped with such aeration impeller which is not associated with the aforementioned drawbacks and limitations of the prior art constructions and which effectively and reliably fulfills the existing need in the art.

Still a further significant object of the present invention relates to a novel construction of sewage treatment plant equipped with a motor driven aerator and possessing a novel support system for the aerator which avoids the previously explained drawbacks of the support constructions employed in the prior art.

Now, in order to implement these and still further objects of the invention which will become more readily apparent as the description proceeds, the invention contemplates the provision of a support mechanism for the aerator which embodies at least two supports which at least at their ends situated closest to the aerator, together with a horizontal plane, enclose an acute angle which is smaller than 45°.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
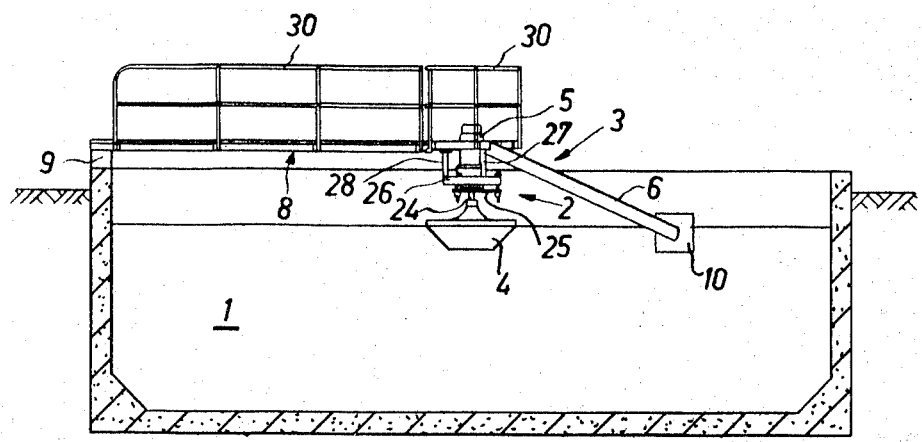
FIG. 1 is a schematic vertical sectional view through a first embodiment of sewage treatment plant equipped with a motor driven aerator constructed in accordance with the teachings of this invention.
Figure 2:
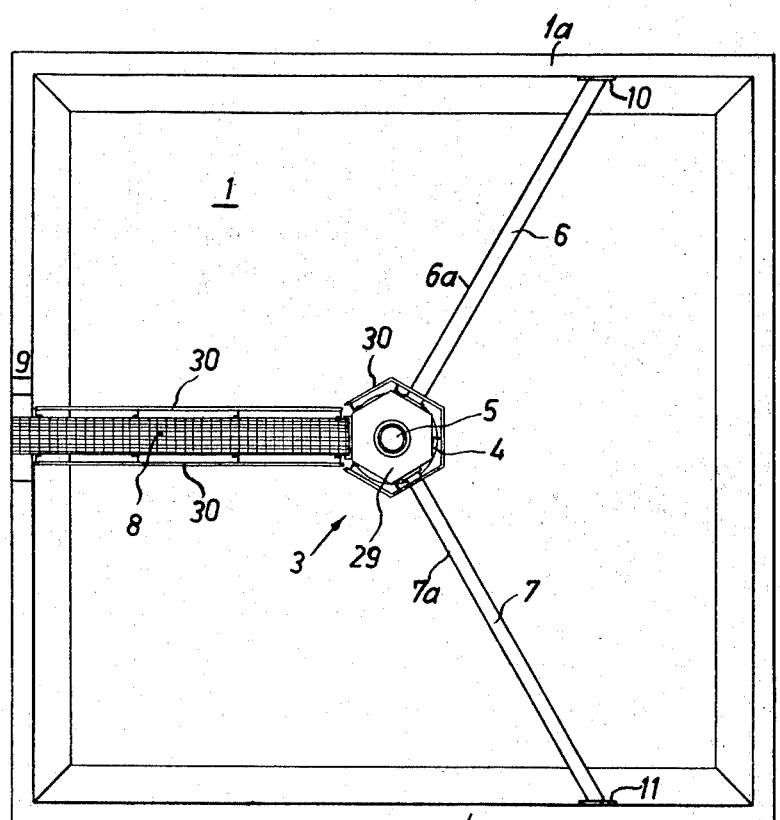
FIG. 2 is a plan view of the sewage treatment plant depicted in FIG. 1.

Describing now the drawings, in FIGS. 1 and 2 there is illustrated a first exemplary embodiment of inventive sewage treatment plant of the type equipped with a motor driven aerator 2 which is secured at a support mechanism 3 in an activator basin 1. This motor driven aerator 2 consists of an aerator impeller or gyroscope 4 and a suitable drive motor or drive unit 5.

Now in the embodiment of sewage or water treatment plant under consideration and depicted in FIGS. 1 and 2 the support mechanism 3 embodies two supports in the form of support elements 6 and 7 which enclose an acute angle with a horizontal plane. This angle is smaller than 45°, preferably amounting to 30°. The support elements 6 and 7 are here in the form of linear rod members 6a and 7a which are connected with one another at one respective end thereof and support the motor driven aerator 2, and at the other respective ends are anchored at the walls 1a of the basin 1. Anchoring of the support elements 6 and 7 can be undertaken, for instance, by the illustrated plate members 10 and 11 attached to the basin walls 1a.

Continuing, it is here mentioned that in the embodiment under discussion the third support element for the motor driven aerator 2 is constituted by a bridge or walkway 8 which connects this motor driven aerator 2 with the basin rim or edge 9 of the previously described type. However, it is also possible and within the contemplation of this invention to employ three supports in the form of the above-discussed rods so that the bridge 8 remains completely unloaded.

Figure 3:
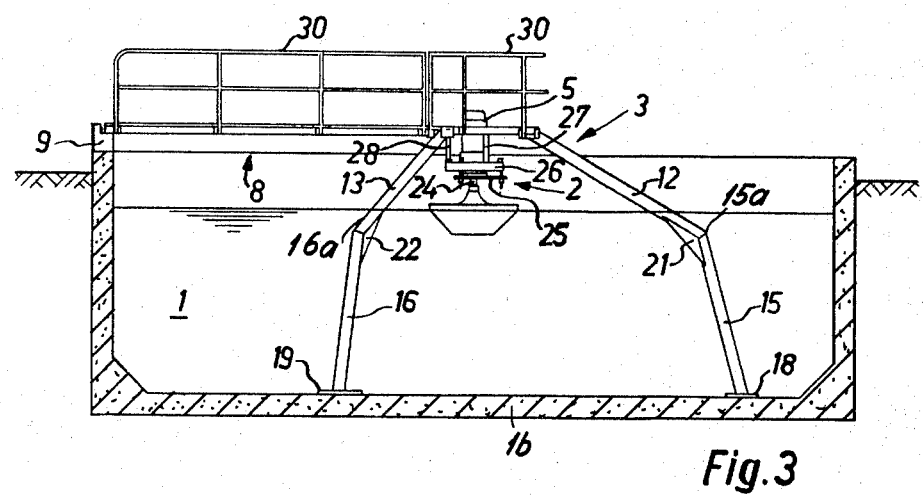
FIG. 3 is a vertical sectional view of a second embodiment of inventive sewage treatment plant.
Figure 4:
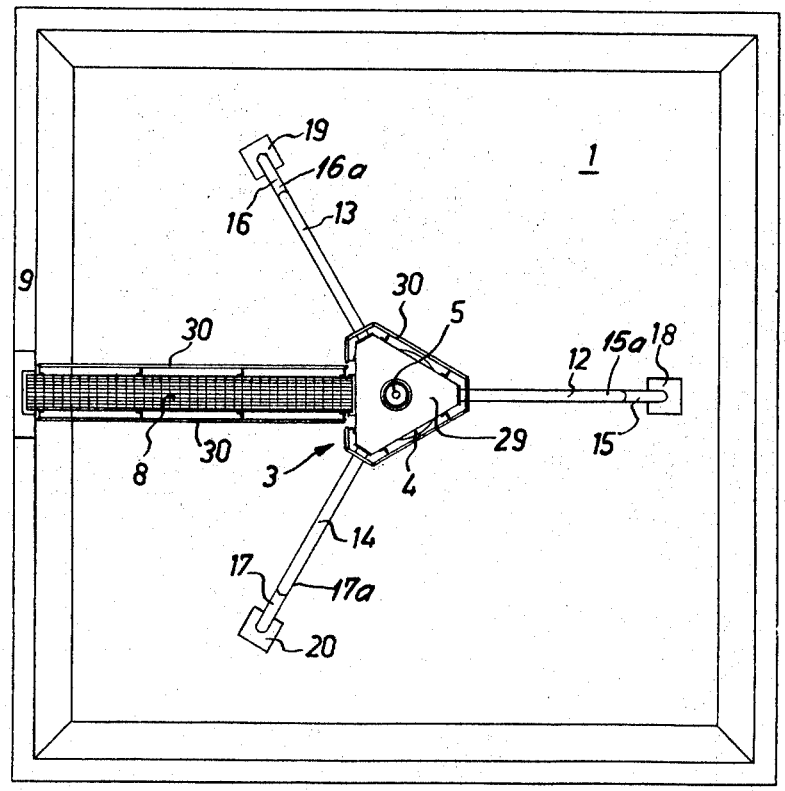
FIG. 4 is a plan view of the sewage treatment plant depicted in FIG. 3.

Now in FIGS. 3 and 4 there is illustrated a second exemplary embodiment of sewage treatment plant as proposed by the invention. In this instance the support mechanism 3 for the motor driven aerator 2 embodies the support elements 12, 13 and 14 which, once again, enclose an acute angle with a horizontal plane. These support elements 12, 13 and 14, which again may be in the form of linear or straight rods, are interconnected with one another at one of their respective ends and support the motor-driven aerator 2. The other respective ends of these support elements 12, 13 and 14 are each rigidly connected with a respective support leg member 15, 16 and 17 to form the three supports for the aerator. Each of these leg members 15, 16 and 17 encloses an angle with the horizontal plane which is greater than that of the connected support element. This angle can be greater than 60°, and preferably amount to 75°. The leg members 15, 16 and 17 are supported upon the basin floor 1b, for instance through the intermediary of plate members 18, 19 and 20 respectively. The knee or bend 15a, 16a, 17a which prevails owing to the interconnection of the respective support elements 12, 13 and 14 with the respective support leg members 15, 16 and 17 is reinforced in each instance by a suitable sheet metal reinforcement plate, two of these reinforcement plates 21 and 22 being visible in FIG. 3.

With this embodiment there is also provided a bridge or walkway 8 which connects the motor driven aerator 2 with the basin rim or edge 9. Furthermore, just as was the case with the first embodiment of FIGS. 1 and 2 here also it would be possible to only use two supports in the form of two bent supports, in which case then the walkable bridge 8 again forms the third support.

Now with the illustrated exemplary embodiment of sewage treatment plant depicted in FIGS. 3 and 4 the motor driven aerator 2 can be attached to the support mechanism 3 in the following manner: the aeration or aerator impeller 4 is attached to the drive shaft 24 of the drive motor or drive unit 5. This drive unit 5 embodies a suitable electric motor which rests upon a triangular plate 25. This triangular plate 25 is connected with a plate or platform 26 which, in turn, is connected via columns 27 and 28 with a platform 29 of a size upon which one can stand or walk i.e. a walkable platform. Both this walkable platform 29 as well as the walkable bridge 8 are then equipped with a safety guard or railing 30.

In summation, it should be pointed out that the proposed constructions of support mechanism for a motor driven aerator arranged in an activator basin provide a number of advantages. Water or sewage spray can not deposit upon the support and therefore ice can not form even during winter operation of the sewage treatment plant. The resistance of the sewage or waste water with regard to the supports is considerably reduced because the support elements as well as also the leg members first immerse into the sewage or waste water near the peripheral region of the activator basin. At this peripheral region of the basin the sewage is already relatively quiescent and is generally moved in a downward direction. Consequently, there is realized a considerable saving in the energy required for moving the sewage and thus for passing air therethrough.

A further advantage of the proposed sewage treatment plants as disclosed herein resides in the fact that the bridge 8 is not subject to oscillations. This is so because either three supports are employed, the inclined portions of which are capable of taking up the force components directed both vertically as well as horizontally and the connection bridge remains completely unloaded, or else, however, the bridge itself forms a support and then it still nonetheless remains free of oscillations since it is primarily loaded by pressure forces.

Supporting the motor driven aerator upon the floor of the basin has a certain disadvantage since the support legs immerse into the waste water or sewage and thus hinder the movement thereof to a certain extent. On the other hand, this constructional form of support mechanism is especially handy during the maintenance and service work at the sewage treatment installation or the like.

While there is shown and described present preferred embodiments of the invention, it is to be distinctly understood that the invention is not limited thereto but may be otherwise variously embodied and practiced within the scope of the following claims.

What is claimed is:

1. A sewage treatment plant, comprising a basin, a motor driven aerator incorporating an aeration impeller, means for supporting said motor driven aerator at least at three points in said basin, said supporting means comprising a platform supporting said aeration impeller and a support mechanism incorporating at least two supports extending laterally from said platform with at least that portion of each support adjacent said platform being inclined downwardly and outwardly at an angle of less than 45° to the horizontal and to the surface of liquid in said basin.

2. The sewage treatment plant as defined in claim 1, in which the remaining portion of each support forms a supporting leg member supported upon the floor of the basin and inclined, to the vertical, toward said support at an angle of less than 45° to the vertical.

3. The sewage treatment plant as defined in claim 1, further including means for anchoring the ends of said supports furthest from said aerator impeller at the wall of said basin.

4. The sewage treatment plant as defined in claim 1, wherein the third point of support for said motor driven aerator comprises a support in the form of a walkable bridge supported at the edge of said basin.

5. The sewage treatment plant as defined in claim 1, further including a walkable platform, connecting said first mentioned platform to a wall of said basin and a railing provided for said walkable platform.

* * * * *